Nov. 13, 1928. 1,691,886
H. S. JANDUS ET AL
VEHICLE BUMPER
Filed Nov. 30, 1927
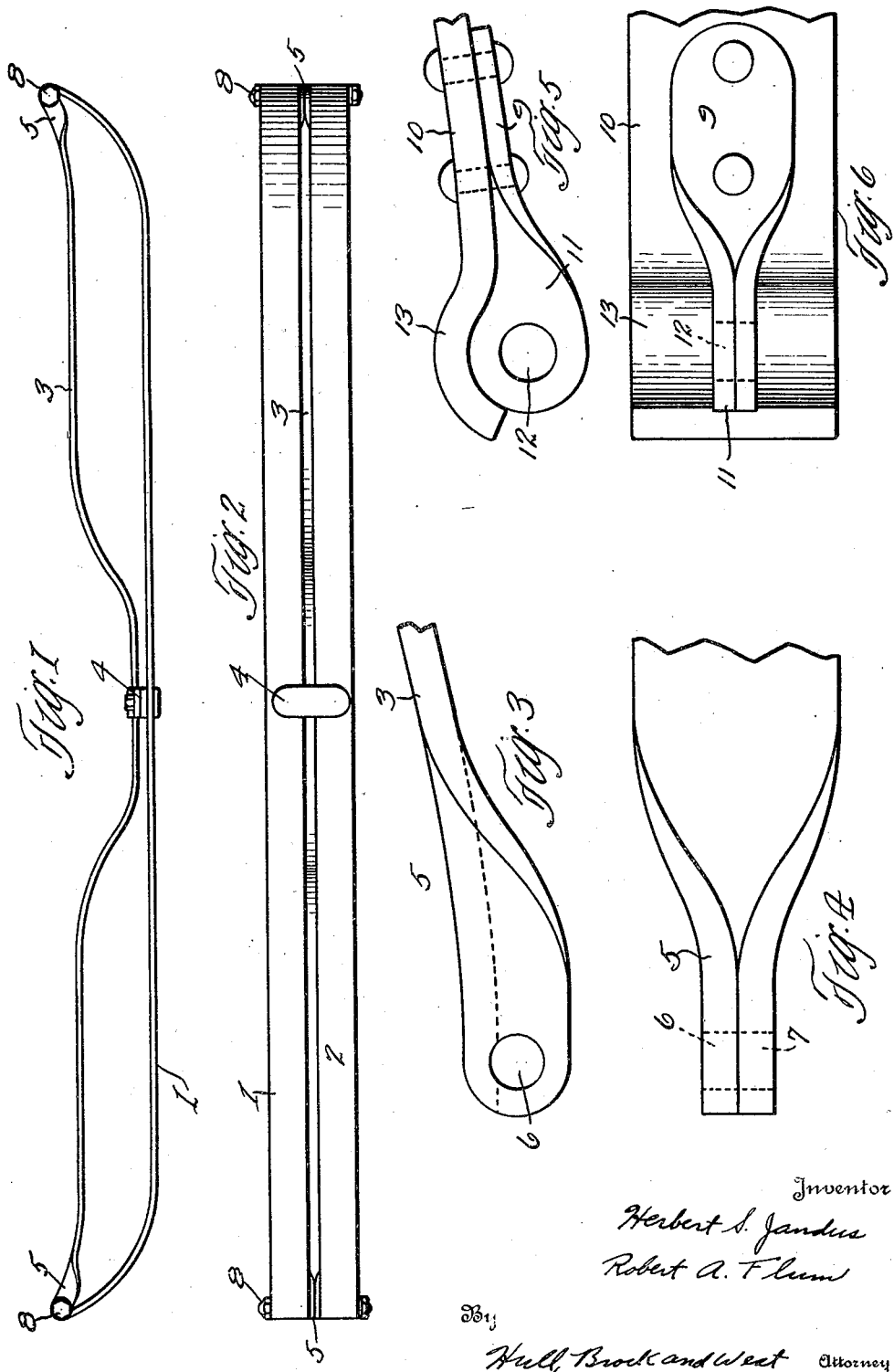
Inventor
Herbert S. Jandus
Robert A. Flinn
By
Hull, Brock and West   Attorney Patented Nov. 13, 1928.

1,691,886

UNITED STATES PATENT OFFICE.

HERBERT S. JANDUS AND ROBERT A. FLUM, OF DETROIT, MICHIGAN, ASSIGNORS TO THE C. G. SPRING & BUMPER COMPANY, OF DETROIT, MICHIGAN, A CORPORATION OF DELAWARE.

VEHICLE BUMPER.

Application filed November 30, 1927. Serial No. 236,754.

This invention relates to vehicle bumpers and more particularly to an improvement in the means for connecting members of the bumper. A further object is to provide a pivotal connection between the bars which will be compact and at the same time of increased strength. Another object is to provide such a connection which can be easily and inexpensively produced. A further object is to provide an improved end connector for pivotally connecting one bumper bar to another.

A further object is to provide improved means for connecting a bar of a bumper to, and between, impact bars positioned close to each other at such points of connection.

Another object is to provide a compact bumper using such a connector and one which will at the same time be of increased strength and attractive in appearance.

Further and more or less limited objects will be apparent from a study of the drawings, from the following description and from the use of the articles defined in the appended claims.

In the drawings Fig. 1 is a plan view of a bumper utilizing our invention; Fig. 2 is a front elevation of the bumper shown in Fig. 1; Fig. 3 is a detail fractional plan view of an end of one of the bars of the bumper; Fig. 4 is a front elevation of the view shown in Fig. 3; Fig. 5 is a detail fractional plan view of the end of a bar showing a modified form of our end connector; and Fig. 6 is a front elevation of the view shown in Fig. 5.

In the following description and claims the impact bars will be considered as the front of the bumper and the terms "front" and "rear" will be used in view of this assumption, but it is not intended to thereby limit the use of our invention to any particular position on the bumper or on the vehicle.

Of the several reference characters shown in the drawings 1 and 2 represent a pair of impact or front bars of a bumper which may be of the general type shown in the McGregor Patent No. 1,372,154 issued March 22, 1921. A rear or auxiliary bar 3 is connected at its ends to the ends of the impact bars and has its central portion bent forwardly for attachment to the impact bars by means of a suitable clamp 4.

The ends of the bar 3 are folded, as shown most clearly in Figs. 3 and 4, to form a flattened portion 5 of double thickness adapted to lie in a plane at substantially a right angle to the plane of the rest of the bar. Registering apertures 6 and 7 are cut through the flattened end portions of the bar for the reception of the shank of a bolt 8. At the ends of the impact bars 1 and 2 suitable aligned eyes are provided and the bolt 8, passing through these eyes and the apertures in the folded ends of the bar 3, provides a pivotal connection between the impact bars 1 and 2 and the rear bar 3.

In a modification of our invention, shown in Figs. 5 and 6, the end connector 9 is riveted, or otherwise fastened to the end portion of the impact bar 10 and has its outer end folded to form a flattened portion 11 through which the aperture 12 is cut. The end of bar 10 is shown at 13 as curved around the flattened portion 11 of the end connector in order to mask the end connector. Such a modification might be used as a substitute for an eye at the end of one of the impact bars.

This invention is a modification of our prior invention disclosed in our application Serial No. 162,150 filed January 19, 1927. The folding of the bar at its ends increases the effective thickness at these points and thereby increases the rigidity of the bar at the points where it is weakened by holes provided for the bolts connecting it to the impact bars. By folding the bar until its edges meet we have increased the effective thickness of the bar at these points to the maximum obtainable by this means.

We have provided a construction wherein the bolt connecting the bars passes through the attached bar substantially parallel to the plane of the bar and with which the vertically spaced impact bars of the bumper may be assembled into a more compact structure.

It is apparent that our invention may be applied to bumpers of different construction and appearance and also that it may be utilized at other points throughout the bumper where it is desired to increase the rigidity of the bars or where it is desirable to pivotally connect two bars. It is also apparent that this invention may be applied where it is not necessary to use an aperture through the bars but where it is simply desirable to increase the rigidity of the bar and/or decrease the width of the same.

It is apparent that our invention might be applied to a portion of a bar intermediate the ends of the bar and that the length of the portion of increased rigidity might be extended, even until it included the entire bar.

It is also apparent that it is not essential to fold the bar until the edges come together since the rigidity of the bar will be increased without going to this extent. We have shown the edges of the rear bar 3 as folded forwardly at their ends but it is obvious that satisfactory results might be obtained by folding it either way. It is not intended to hereby restrict the invention to the particular embodiment herein shown and described since many applications of the invention would be apparent to one skilled in the art.

Having thus described our invention, what we claim is:

1. An end connector for a bumper bar comprising a portion at the end of the bar having a surface folded upon itself.

2. An end connector for a bumper bar comprising a portion at an end of the bar having a surface folded upon itself and an aperture through said folded portion.

3. An end connector for a bumper bar comprising a bar so folded that its edges at an end are brought together to form a section of increased effective thickness.

4. An end connector for a bumper bar comprising a bar folded at an end to bring its edges together to form a flattened portion at an angle to the plane of said bar, said bar having a hole through said flattened portion.

5. An end connector for a bumper bar comprising a bar folded at an end to bring its edges together to form a flattened portion at substantially a right angle to the plane of said bar, said bar having an aperture through said flattened portion.

6. A bumper bar folded lengthwise until its lateral edges are adjacent each other.

7. A bumper bar having its lateral edges through a portion of their length folded together.

8. A bumper bar having an end portion longitudinally folded upon itself.

9. A bumper bar having an end portion longitudinally folded upon itself and having an aperture through said folded portion.

10. A bumper bar folded so that its edges at an end are brought together, said bar having an aperture through said folded portion.

11. A bumper bar folded so that its lateral edges, through a portion of their length, are adjacent, said bar having an aperture through the folded portion.

12. A bumper bar folded so that its edges through a portion of their length are brought together and a flattened section is formed at an angle to the plane of the bar.

13. A bumper bar folded so that its edges through a portion of their length are brought together and a flattened portion is formed at an angle to the plane of the bar, said bar having a hole through said flattened portion.

14. A bumper bar folded upon itself at an end so that a section of increased rigidity is formed, said bar having an aperture passing through said section at substantially a right angle to the folded portion.

15. A bumper bar folded so that its lateral edges are brought together through a portion of their length to form a section of increased effective thickness, said bar having an aperture through said portion substantially at a right angle to said folded portions.

16. A bumper comprising a pair of impact bars and a rear bar adapted to be connected to and between said impact bars, said rear bar being folded at the portion to be connected.

17. A bumper comprising a pair of impact bars and a rear bar adapted to be connected to and between spaced portions of said impact bars, said rear bar being folded and having an aperture through the portion to be connected.

18. A bumper comprising a pair of impact bars having portions vertically spaced and a rear bar having portions folded together and adapted to fit between said vertically spaced portions, and means for clamping together said impact and rear bars.

19. A bumper comprising a pair of impact bars having vertically spaced end portions, a rear bar having an end portion folded together and adapted to fit between the spaced portion of said impact bars, said rear bar having an aperture through said folded portion, and means, passing through said aperture, for connecting said rear and impact bars.

20. A bumper comprising an impact section, a bar pivotally connected thereto, said bar having a longitudinal portion folded upon itself and an aperture through said folded portion, and a bolt passing through the said aperture for connecting the bar to the impact section.

21. A vehicle bumper comprising a pair of vertically spaced impact bars having eyes at their ends, a rear or auxiliary bar having its end portions longitudinally folded to form a flattened section and having an aperture in said folded portion in alignment with the eyes of said impact bars, and a bolt passing through said apertures and eyes.

22. A bumper comprising an impact section, a bar pivotally connected thereto at an end, said bar having a portion folded upon itself and an aperture therethrough, and a pin passing through said aperture for connecting the bar to the impact section.

23. A bumper comprising an impact section, a bar connected thereto, said bar being folded upon itself at the portion to be connected, and means for clamping said folded portion to said impact section.

24. A bumper bar having an end connector fastened thereto, said end connector having an end portion folded together and an aperture in said folded portion.

25. A bumper comprising an impact section including a pair of bars having spaced portions, a bar of greater width than a space between said impact bars and adapted to be connected therebetween, said bar having bent portions of double thickness at points where it is to be connected, and means for fastening said bars together.

26. A bumper comprising an impact section including a pair of bars having spaced portions, a bar of greater width than a space between said impact bars and adapted to be connected therebetween, said bar having a folded portion of double thickness at the portion to be connected and having an aperture in said folded portion, and means passing through said aperture for connecting said last mentioned bar to said impact section.

27. A bumper comprising an impact section including a pair of impact bars having spaced portions, a reinforcing bar adapted to be connected at its end portions to the impact bars and having a forwardly arched middle section adapted to be connected to said impact bars, said reinforcing bar having a folded portion where it is connected to said impact section, and means for clamping said reinforcing bar to said impact section.

28. A bumper comprising an impact section including a pair of bars having vertically spaced portions, a reinforcing bar adapted to be connected at its end portions to said impact section and having a forwardly arched portion adapted to be connected to said impact section, said bar having a portion folded at a point to be connected to said impact bar and having an aperture in said folded portion, and means passing through said aperture for clamping said reinforcing bar to said impact section.

29. A bumper comprising an impact section including a pair of bars having vertically spaced portions, a reinforcing bar adapted to be connected at its end and middle portions to said impact section, said reinforcing bar having folded end connectors with apertures therein, and means passing through said apertures for clamping said bars together.

In testimony whereof, we hereunto affix our signatures.

HERBERT S. JANDUS.
ROBERT A. FLUM.